(12) United States Patent
Samadzadegan et al.

(10) Patent No.: US 10,906,296 B2
(45) Date of Patent: Feb. 2, 2021

(54) DENSITY FLUCTUATION COMPENSATION DURING PRINT HEAD REPLACEMENT

(71) Applicant: HEIDELBERGER DRUCKMASCHINEN AG, Heidelberg (DE)

(72) Inventors: Sepideh Samadzadegan, Leimen (DE); Hans Koehler, Edingen-Neckarhausen (DE); Nikolaus Pfeiffer, Heidelberg (DE); Annika Kamper, Dossenheim (DE)

(73) Assignee: Heidelberger Druckmaschinen AG, Heidelberg (DE)

( * ) Notice: Subject to any disclaimer, the term of this patent is extended or adjusted under 35 U.S.C. 154(b) by 0 days.

(21) Appl. No.: 16/583,391

(22) Filed: Sep. 26, 2019

(65) Prior Publication Data
US 2020/0094546 A1 Mar. 26, 2020

(30) Foreign Application Priority Data

Sep. 26, 2018 (DE) .................... 10 2018 216 434

(51) Int. Cl.
*B41J 2/045* (2006.01)
*H04N 1/60* (2006.01)
*B41J 29/393* (2006.01)

(52) U.S. Cl.
CPC ......... *B41J 2/04508* (2013.01); *B41J 29/393* (2013.01); *H04N 1/6097* (2013.01)

(58) Field of Classification Search
CPC ... B41J 2/04508; B41J 29/393; H04N 1/6097; H04N 1/604; G06K 15/027
See application file for complete search history.

(56) References Cited

U.S. PATENT DOCUMENTS

| | | | |
|---|---|---|---|
| 2003/0086102 A1 | 5/2003 | Soler et al. | |
| 2011/0280589 A1* | 11/2011 | Chandu | H04N 1/6097 399/15 |
| 2014/0071465 A1 | 3/2014 | Fernandez Del Rio et al. | |
| 2017/0201654 A1 | 7/2017 | Rius Rossell et al. | |
| 2017/0217163 A1 | 8/2017 | Trachanas et al. | |
| 2018/0099510 A1* | 4/2018 | Niino | B41J 2/2146 |
| 2019/0126609 A1* | 5/2019 | Mizutani | B41J 2/04536 |

FOREIGN PATENT DOCUMENTS

DE  102016201245 A1  8/2017

\* cited by examiner

*Primary Examiner* — Julian D Huffman
(74) *Attorney, Agent, or Firm* — Laurence A. Greenberg; Werner H. Stemer; Ralph E. Locher (57) ABSTRACT

A method compensates for position-dependent density fluctuations of print nozzles in an inkjet printing machine by use of a computer. The computer produces compensation profiles for the position-dependent density fluctuations over all the print heads for all print substrates used, calculates an mean profile from these, and applies the mean profile to compensate for the position-dependent density fluctuations in the inkjet printing machine. When one or more print heads of the inkjet printing machine are replaced, the computer calculates a new compensation profile for only one print substrate. The computer derives a new mean profile from this, and the computer calculates and applies the new mean profile using the old compensation profiles for the remaining print substrates.

7 Claims, 9 Drawing Sheets

DENSITY FLUCTUATION COMPENSATION DURING PRINT HEAD REPLACEMENT

CROSS-REFERENCE TO RELATED APPLICATION

This application claims the priority, under 35 U.S.C. § 119, of German application DE 10 2018 216 434.7, filed Sep. 26, 2018; the prior application is herewith incorporated by reference in its entirety.

BACKGROUND OF THE INVENTION

Field of the Invention

The invention discloses a method of compensating for position-dependent density fluctuations of print nozzles in an inkjet printing machine by a computer.

The invention relates to the technical field of inkjet printing.

The current state of the print nozzles of an inkjet print head plays a decisive role in the resulting print quality in the operation of inkjet printing machines. In particular, there are two influencing factors that influence the print quality. For example, the reduced function of an individual print nozzle leads to stripe-like artifacts in the print image along the corresponding print direction of the relevant print nozzle. The extent to which this artifact influences the resulting print quality depends on the type of reduced function of the print nozzle. These reduced functions range from slight geometric deviations in the print dot of the print nozzle to reduced ink ejection and complete failure of the print nozzle. In addition, print nozzles that deviate too much from the desired behavior are deactivated by the control of the inkjet printing machine so that these defective print nozzles may be compensated for cleanly and systematically. Various approaches are known for compensating for such defective or deactivated print nozzles. The most common is compensation by the adjacent print nozzles, which usually produce an increased ink ejection so as to fill the white line caused by the failure or shutdown of the relevant print nozzle.

A second major factor influencing the print quality of an inkjet printing machine is the fact that the print nozzles differ minimally from each other in terms of their ink ejection behavior. These deviations are manufacturing-related, and also depend on the different aging of the print nozzles, which may also be influenced by a different load on the print nozzles. Consequently, print nozzles which are to print the same color value, for example, must be controlled slightly differently with regard to their ink ejection in order to achieve this same color value. Or, put differently: Even if the ink ejection of these two print nozzles are controlled identically, slightly different resulting color values will be obtained. This phenomenon is also referred to as density fluctuation, because identically-controlled print nozzles generate a different resulting print density on the substrate.

Compensation profiles (DUMC) are used to compensate for these density fluctuations. These compensation profiles, in their ultimate effect, are simply control profiles that have a minimum positive or negative offset for each print nozzle, which ensures that each print nozzle delivers the same resulting color value when it is controlled in the same way. If, for example, a nozzle prints slightly too much ink relative to a standard target value due to its density fluctuations, the compensation profile for this print nozzle contains a small negative offset that compensates for the density fluctuations of this print nozzle. These compensation profiles are provided, first, by the manufacturer of the inkjet print heads and in that case they contain the density fluctuations caused by manufacturing. In addition, these profiles may be, and are, also updated regularly by the manufacturer of the corresponding inkjet printing machine in which the inkjet print heads are installed, and/or by the user of the inkjet printing machine. This is usually done on a more or less regular basis as part of the test printing of a calibration procedure. With these updated compensation profiles, the aging-induced density fluctuations of the print nozzles are then compensated.

But this leads to a problem, because the compensation profiles are created specifically for one print head and an inkjet printing machine normally uses many print heads. For example, when replacing one of the inkjet print heads, which is required regularly during operation of the inkjet printing machine, the compensation profile must be updated, which as the resulting compensation profile extends over all the print heads used. As a rule, this update requires a complete calibration procedure, during which a new compensation profile must be created for all print substrates used. This involves a great deal of effort, which severely impairs the performance of the inkjet printing machine. Particularly in the case of frequent print head changes, which already represent a significant economic burden, the recalibration leads to additional undesired expenses.

An example of such a prior art method for creating a compensation profile to compensate for density fluctuations in an inkjet printing machine is known from the published, non-prosecuted German patent application DE 10 2016 201 245 A1. This application discloses how undesired fluctuations in print density may be corrected quickly and easily in the ink density by changing the number or size of the print dots to be applied to the printed material or substrate. However, in this case is still necessary to carry out the calculation process for the new compensation profile for all print substrates to be used.

SUMMARY OF THE INVENTION

The object of this invention is therefore to disclose a method of compensating for fluctuations in print density in the print nozzles of an inkjet printing machine that is more efficient and less complex than the methods known from the prior art.

The object is accomplished by a method for compensating position-dependent density fluctuations of print nozzles in an inkjet printing machine by use of a computer. The computer produces compensation profiles for the position-dependent density fluctuations over all the print heads for all print substrates used, calculates an mean profile from these, and applies this mean profile to compensate for the position-dependent density fluctuations in the inkjet printing machine. When one or more print heads of the inkjet printing machine are replaced, the computer calculates a new compensation profile for only one print substrate, the computer derives a new mean profile from this, and the computer calculates and applies the new mean profile using the old compensation profiles for the remaining print substrates. Thus, the key point of the method according to the invention is that a new compensation profile is no longer calculated for each print substrate to be used, which would be associated with the corresponding effort; instead, an adapted compensation profile is created for only one print substrate and the new mean profile is then derived from this profile. The compensation profiles for the other print substrates used are then calculated from this new mean profile. This means that the cumbersome calibration process for creating new compensation profiles only has to be carried out for one print substrate and no longer for all print substrates, which significantly reduces the effort required to operate the inkjet printing machine. This procedure naturally leads to somewhat less precise compensation profiles for the print substrates that are not measured; however, the compensation profiles obtained in this way are absolutely sufficient to compensate for the position-dependent density fluctuations of the print nozzles. Compared to the performance gain obtained by applying the method according to the invention, the quality losses in the calculated new compensation profiles are negligible.

Advantageous and therefore preferred refinements of the method are found in the associated dependent claims as well as in the description with the associated drawings.

A preferred refinement of the method according to the invention is to create a parameter set for each respective compensation profile, which contains data about a print substrate, as well as about certain parameters of the inkjet printing machine and prepress data. A corresponding compensation profile is then created for each of these parameter sets. The compensation profiles are therefore dependent not only on the print substrate used, but also on the corresponding settings of the inkjet printing machine and the associated prepress data. In addition, compensation for density fluctuations may already be included if they are known to be caused by the print head hardware. This data is usually provided by the print head manufacturer and is then likewise included in the compensation profile.

Another preferred refinement of the method according to the invention is that a measurement is carried out for each parameter set with the associated print substrate and the parameters of the inkjet printing machine and prepress data, and the respective compensation profile is produced based on this measurement. To then obtain the respective compensation profiles from the given parameter sets, a test measurement with the respective print substrate that is selected and used together with the predetermined parameters of the inkjet printing machine must be carried out in the present method according to the invention, and the corresponding compensation profile is then created based on it. This calculation of the individual compensation profiles for the respective print substrate used and the corresponding settings of the inkjet printing machine are, of course, only calculated once at the beginning, if no compensation profiles yet exist. If compensation profiles already exist for the print process to be carried out with the selected inkjet printing machine, this step no longer needs to be carried out. In the case of the replacement of one, a plurality or even all print heads, the method according to the invention is applied to calculate the new, adapted compensation profiles.

Another preferred refinement of the method according to the invention is that the computer uses the new mean profile to calculate new compensation profiles for the remaining print substrates. The new mean profile may then be used to adapt the remaining compensation profiles to the remaining print substrates. This is absolutely sufficient, at least transitionally. If at new measurements are carried out on a regular basis anyway at some time, the compensation profiles that had only been calculated may then be updated with real measurement data.

Another preferred refinement of the method according to the invention is that the compensation profiles and the mean profile correspond to functions whose function values are the compensation values for the density fluctuations in the print head, which are dependent on the position of the respective print nozzle in the print head. The profile in this case is a function that contains the compensation amplitude, i.e. essentially the positive or negative offset with which the density fluctuation that deviates from the target is compensated, the function then being calculated via the position of the individual print nozzles of the respective print heads.

Another preferred refinement of the method according to the invention is that, in order to calculate the mean profile from the individual compensation profiles, the computer determines the similarity of all the generated compensation profiles to the calculated mean profile by means of a mathematical check, and then calculates and applies a new mean profile from a selection of the most similar compensation profiles. The advantage of this approach is that individual compensation profiles that are similar to one another may be grouped together, with group membership being determined by a threshold value of the degree of similarity. If the mean profile is then calculated from such a group, logically, the resulting mean profile is much more similar to the individual compensation profiles for the different print substrates than if a corresponding mean profile is formed from completely different compensation profiles. Thus, the mean profile calculated in this way is of course much more suitable for use in the inkjet printing machine than a mean profile formed from random compensation profiles.

Another preferred refinement of the method according to the invention is that the method is used in a sheet-fed or web-fed inkjet printing machine. Because density compensation is practically always standard in today's industrial inkjet printing machines, i.e. not in home and office printers, the method according to the invention may also be applied analogously in all such inkjet printing machines, whether these printing machines are sheet-fed or web-fed.

The invention as such, and structural and/or functional refinements of the invention that are advantageous in terms of design and/or function, are described in greater detail below in connection with the associated drawings, with reference to at least one preferred exemplary embodiment. In the drawings, elements corresponding to each other are respectively assigned the same reference signs.

Other features which are considered as characteristic for the invention are set forth in the appended claims.

Although the invention is illustrated and described herein as embodied in a density fluctuation compensation during print head replacement, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DETAILED DESCRIPTION OF THE INVENTION

Figure 1:
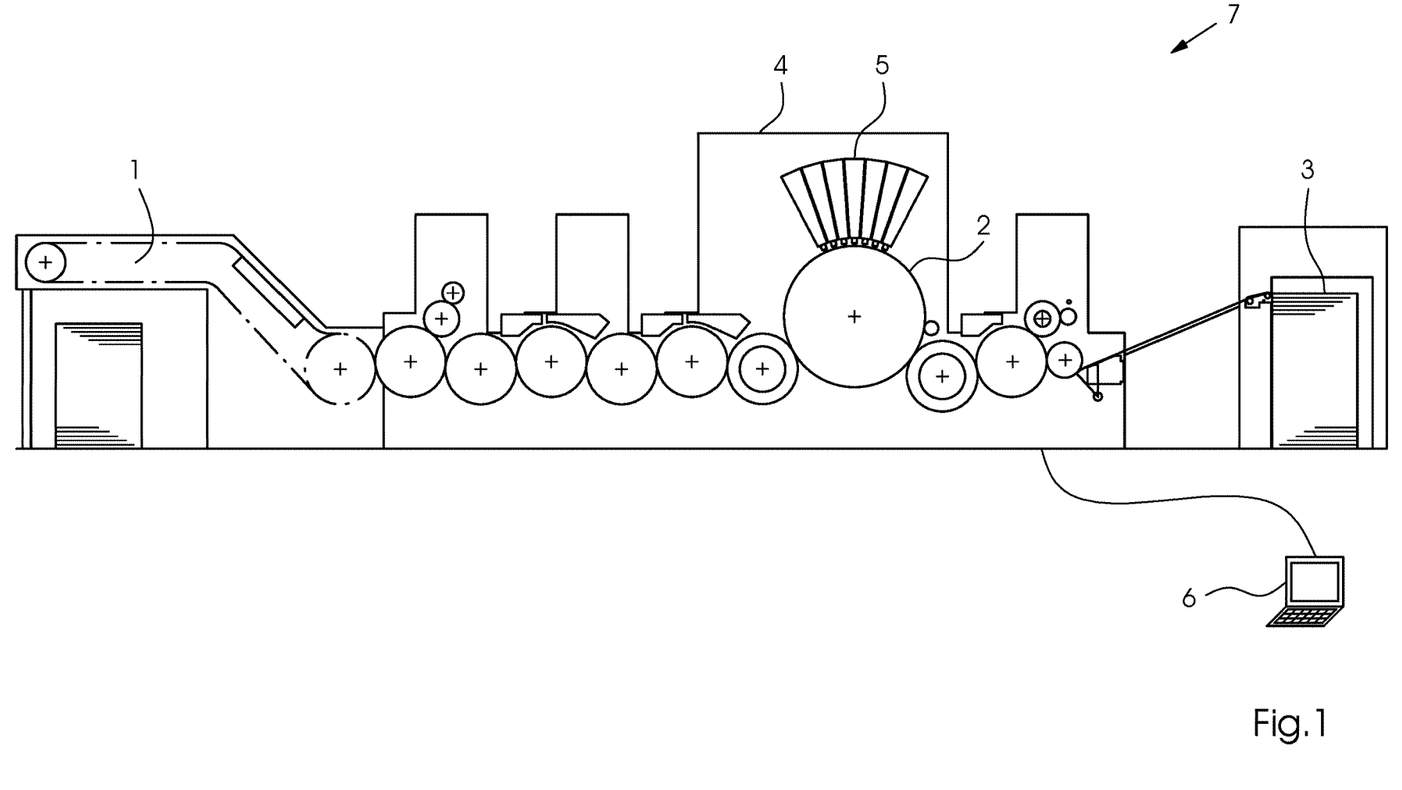
FIG. 1 is a diagrammatic, side view of an example of a structure of an inkjet printing machine system.

Referring now to the figures of the drawings in detail and first, particularly to FIG. 1 thereof, there is shown a field of application of a preferred embodiment of an inkjet printing machine 7. FIG. 1 shows an example of the basic structure of such a machine 7, consisting of a feeder 1 for feeding the print substrate 2 into the printing unit 4, where it is printed by the print heads 5, and out to the delivery unit 3. This is a sheet-fed inkjet printing machine 7, which is controlled by a control computer 6. During operation of this printing machine 7, there may be fluctuations in the resulting surface density of the individual print nozzles, as described above. The compensation of these local density fluctuations in the inkjet printing machine 3, according to the invention, is carried out by using compensation profiles, which ensure the compensation of the density fluctuations by changing the number or size of the print dots to be applied to the printed material 2 or the print substrate 2.

Figure 9:
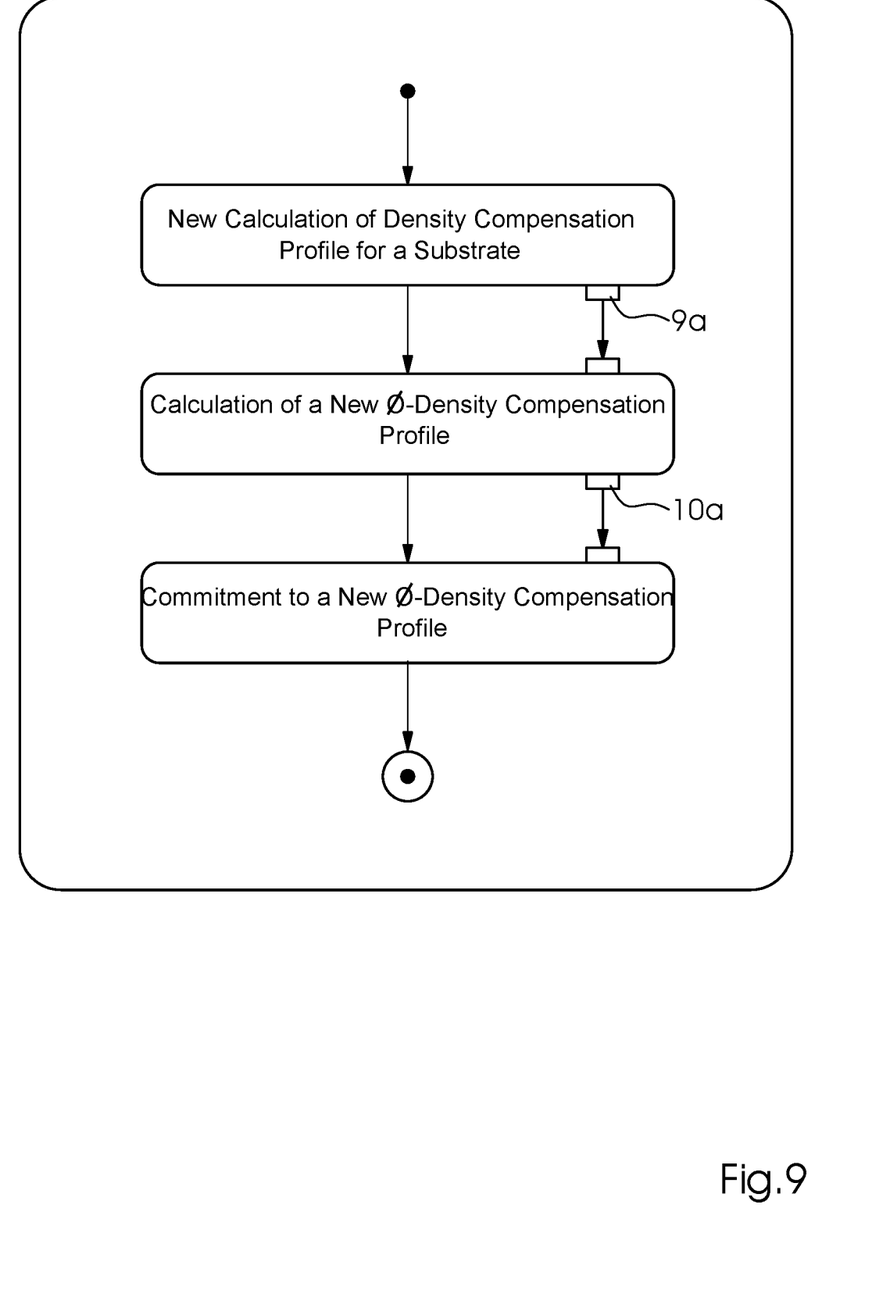
FIG. 9 is a flow chart showing a schematic course of a method according to the invention.

FIG. 9 schematically illustrates a process flow of a method according to the invention. This method runs through a plurality of steps and is performed by the computer 6.

Figure 2:
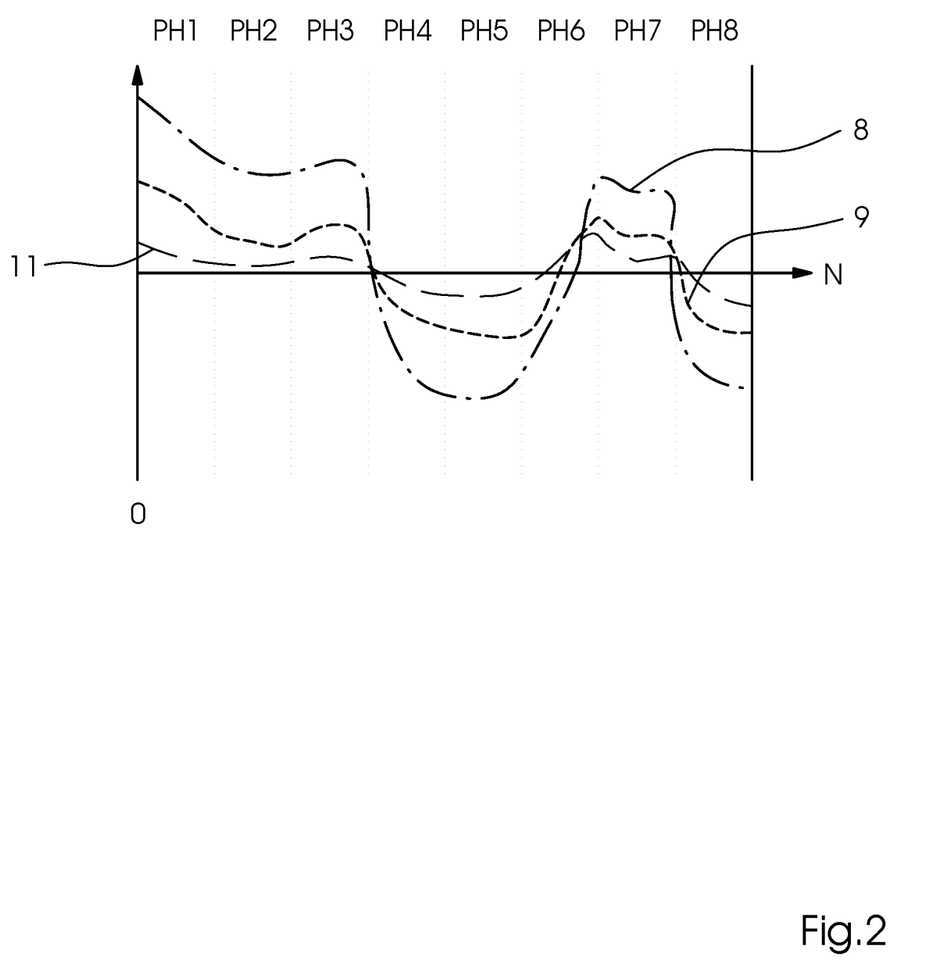
FIG. 2 is a graph showing an example of different compensation profiles.

Step 1:

A machine parameter set defines a group of parameters based on a given print substrate and a plurality of parameters of the printing machine and the prepress stage. The machine parameter set also includes corrections for such density fluctuations that are caused by the print head hardware. For a certain group of machine parameter sets (MPSs), compensation profiles 8, 9, 11 are measured to correct the density fluctuations and are stored in a database for the MPS DUC compensation profiles 8, 9, 11. The compensation profiles 8, 9, 11 are measured over the direction of movement of the print substrate or over the width of the print head 5 and are functions of the form MPS-DUCx (n)=DUCAmplitude; where n is the print head nozzle number, x represents the specific compensation profile of the density unevenness in the specific MPS x. FIG. 2 shows an example of such compensation profiles 8, 9, 11 for certain machine parameter sets.

Figure 3:
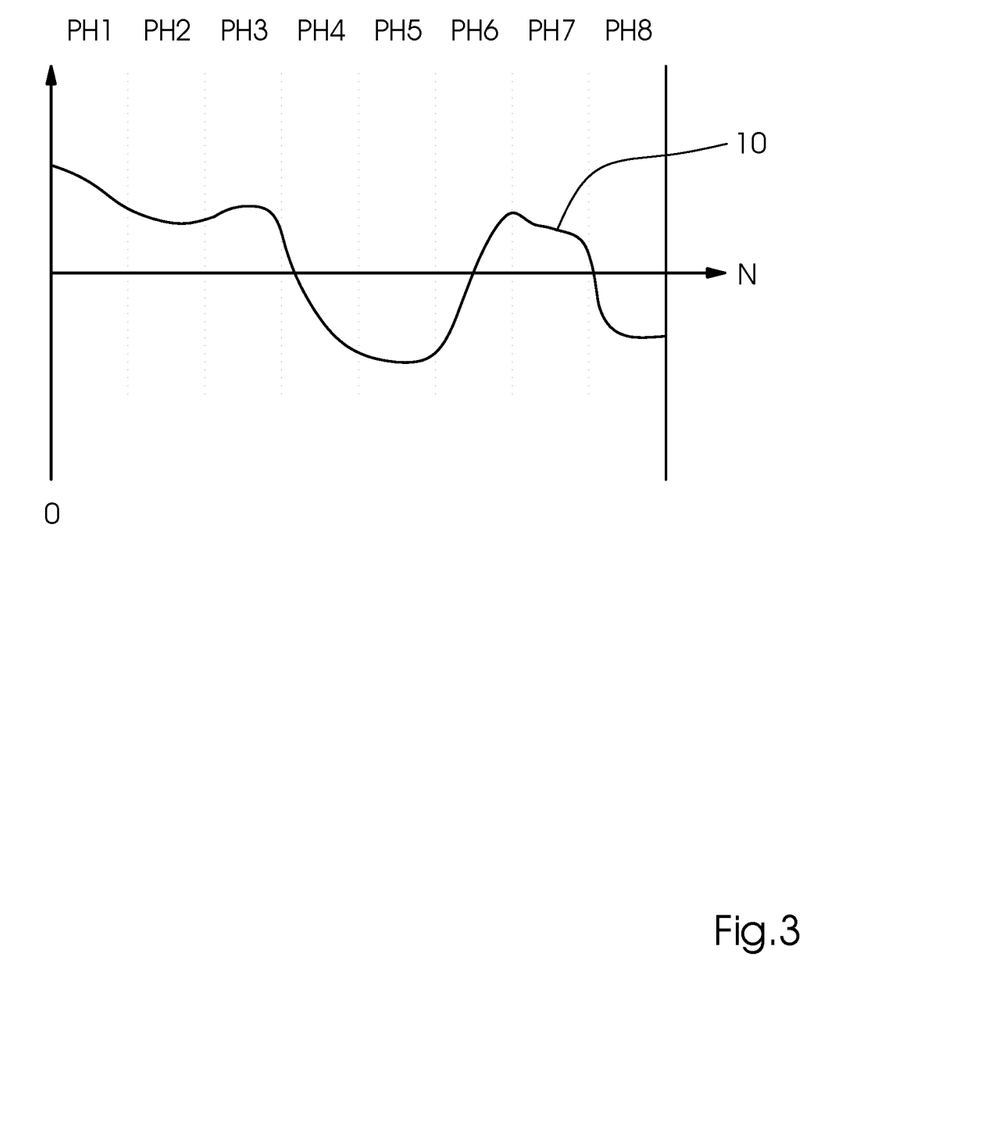
FIG. 3 is a graph showing an example of an average compensation profile.

Step 2:

After filtering and removing outliers from the MPS-DUC x compensation profiles 8, 9, 11, it is possible to calculate a mean profile 10 from all included compensation profiles: the mean DUCMPS (n) 10. The signals are not normalized, so as to maintain the different amplitude levels in the individual signals. Optionally, it may be checked by a similarity metric, for example by an RMS difference or another approach, how similar an MPS-DUCx (n) compensation profile 8, 9, 11 is to the mean DUCMPS (n) 10. Having been derived therefrom, MPS-DUCx compensation profiles 8, 9, 11 may be selected so as to form a group of MPS-DUCx compensation profiles 8, 9, 11 from all these compensation profiles, and from that group, a new mean MPS-DUCx compensation profile 10 is then calculated, the similarity of which to the mean compensation profile 10 must be greater than defined similarity criteria (i.e. threshold-based), FIG. 3 shows such an mean MPS-DUC compensation profile 10.

Step 3:

For all MPS-DUCx compensation profiles 8, 9, 11 or for those in the same group, a scalar (Lambda-Li) is equated:

$$li \times MEAN\text{-}DUCMPS(n) = \sim MPS\text{-}DUCI(n).$$

Figure 4:
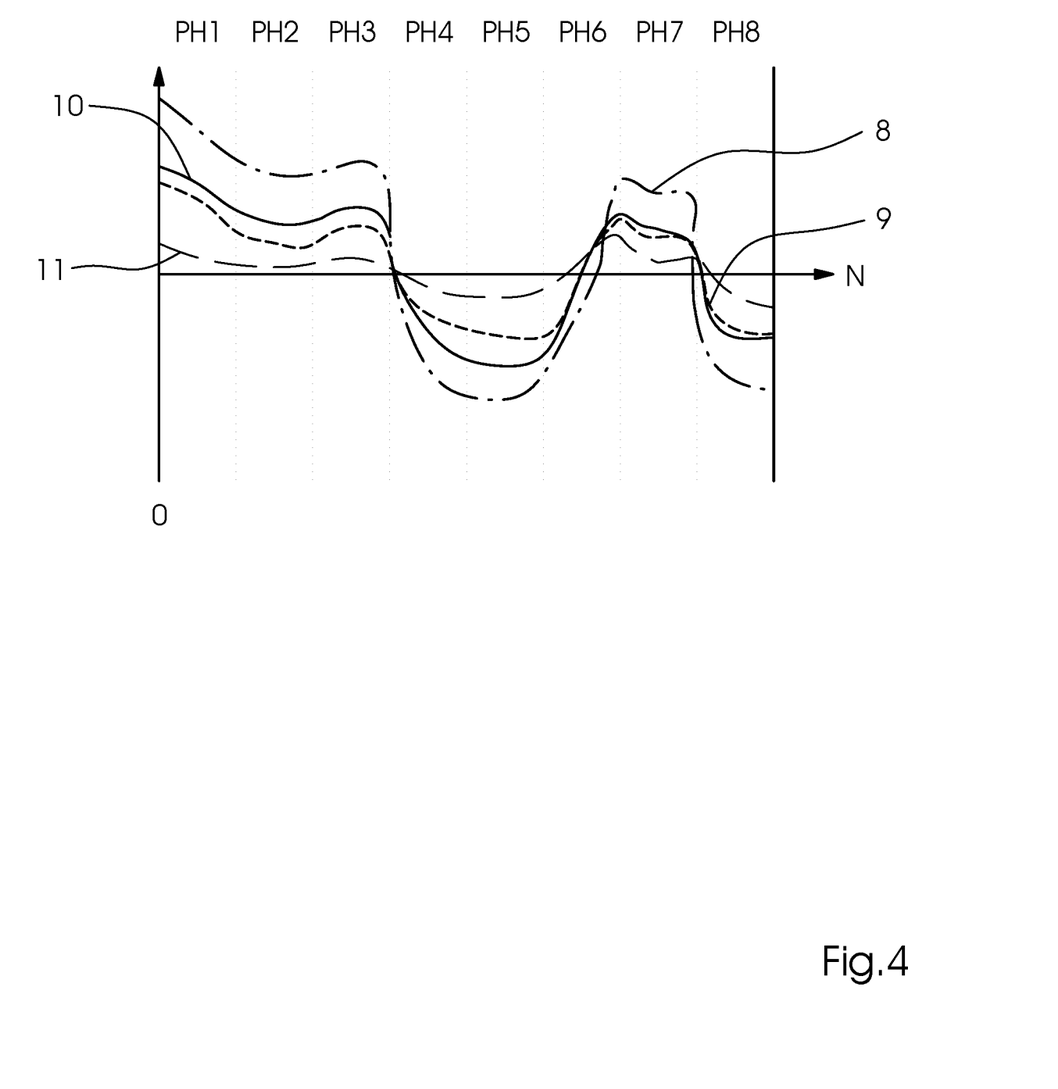
FIG. 4 is a graph showing several examples of different compensation profiles for different substrates.

Especially for the MPS-DUC compensation profiles 8, 9, 11, which are "similar enough" to the mean MPS-DUC compensation profile 10 (i.e. the grouping option of step 2 is used), this should be a good approximation. As an alternative approach for finding the suitable compensation profiles 8, 9, 11, the following functional approximation approach is offered in addition to a simple scalar multiplication, which is also shown in FIG. 4 based on a plurality of examples:

$$Fi(\text{mean } DUCMPS(n)) = \sim MPS\text{-}DUCI(n).$$

Figure 5:
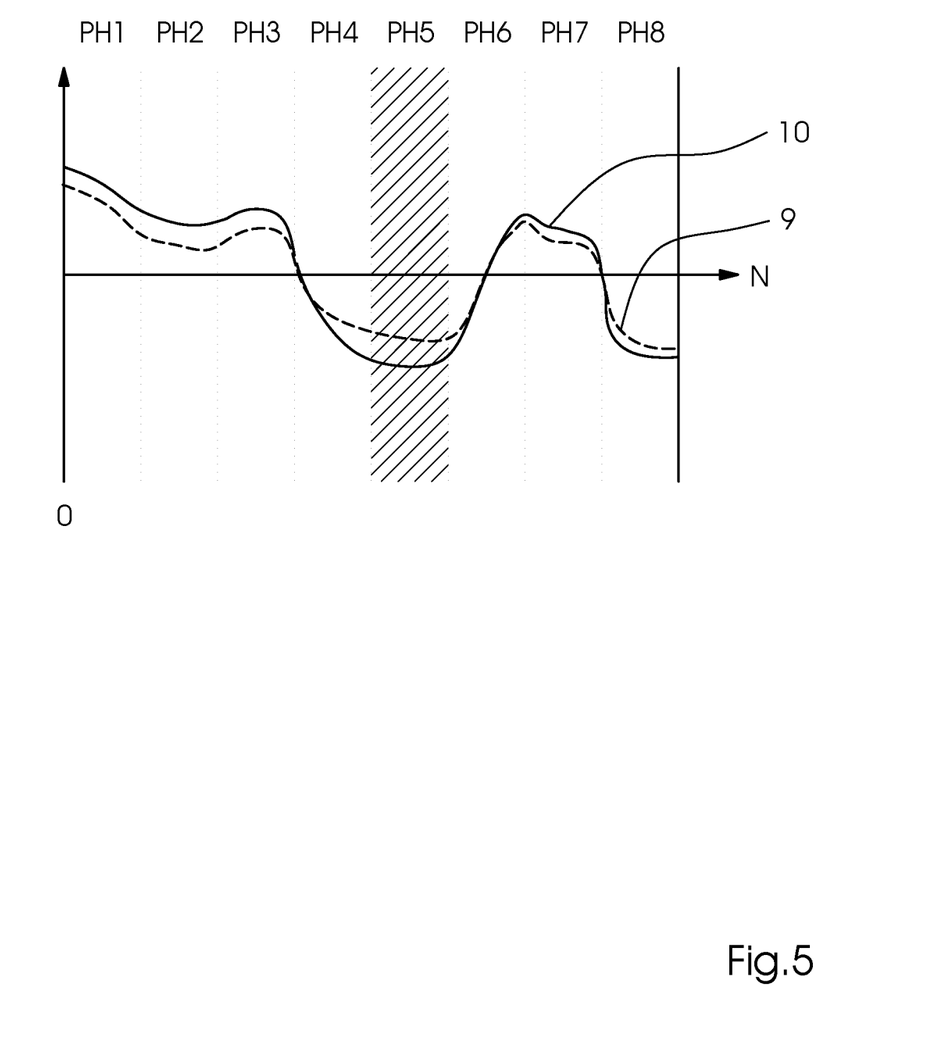
FIG. 5 is a graph showing different compensation profiles upon exchange of a print head.

Step 4:

This step is the actual core of the method according to the invention, which uses the scenario that one of the print heads 5 must be replaced. The MPS_DUMC database is informed about the header exchange using the IDs of the print heads 5 used. In FIG. 5, the fifth print head 5 is replaced. Due to the specific density fluctuation distribution of the new print head 5, in the worst case it may happen that a specific correction of the density fluctuations is required for this print head 5 that is exactly the opposite of the previous print head 5 (high negative correction—reduction of density to high positive correction—increasing density). All MPS-DUC (x) 8, 9, 11 and the mean $DUC_{MPS}(n)$ 10 are invalid in this case in the region of the replaced print head 5 (see FIG. 5).

Figure 6:
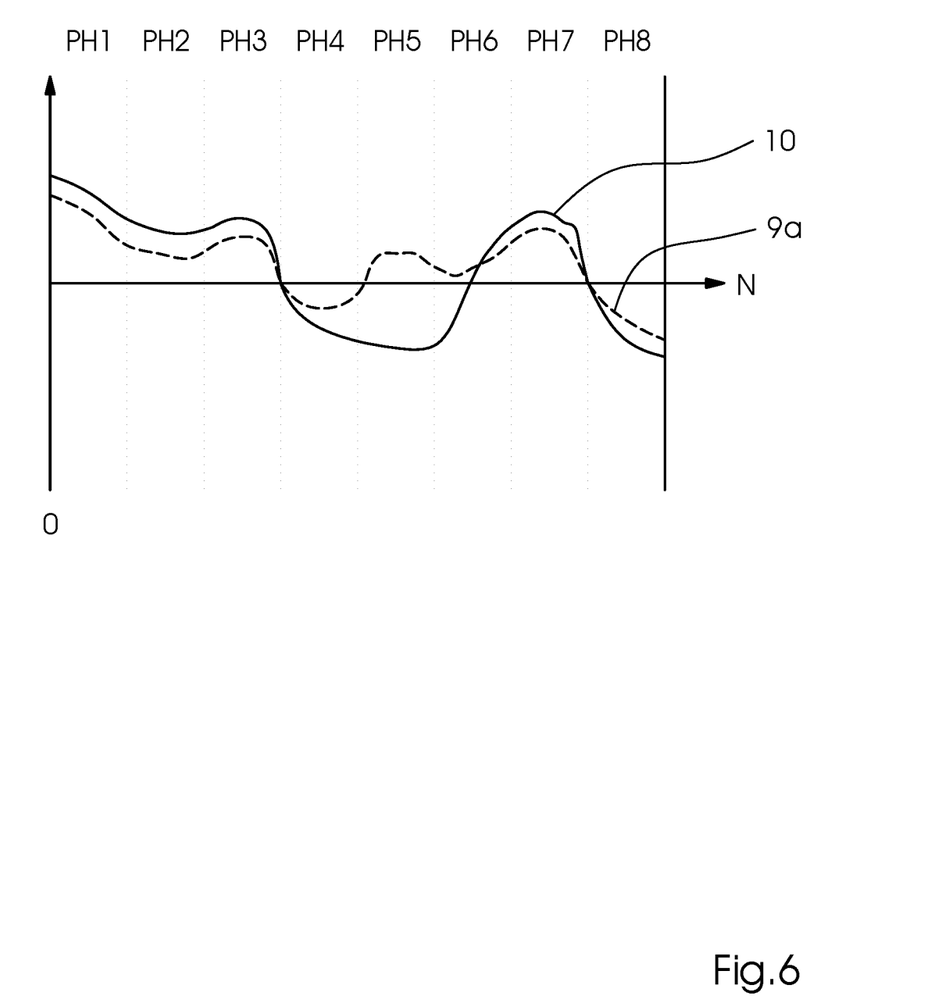
FIG. 6 is a graph showing different compensation profiles upon newly computing a profile.

Step 5:

The measurement of the MPS-DUCi (n) compensation profile 9 is therefore repeated for a single MPS. After the individual measurement, the system obtains a valid MPS-DUCi'(n) compensation profile 9a. FIG. 6 shows what this looks like in the example of FIG. 4 for MPS-DUCI'(2) 9a.

Step 6:

The Lambda-Li formula shown defines the linear relationship of the mean $DUC_{MPS}(n)$ compensation profile 10 to the MPS-DUCi (n) compensation profile 8, 9, 11. Accordingly, the invalid range of the mean $DUC_{MPS}(n)$ compensation profile 10 may be calculated as follows:

$$MPS\text{-}DUCi'(n)/li = \sim \text{Mean } DUC_{MPS}'(n).$$

According to the alternative approach in step 3), steps 6) are performed with the inverted function:

$$Fi\text{-}1(MPS\text{-}DUCI(n)) = \text{Mean } DUC_{MPS}(n).$$

Figure 7:
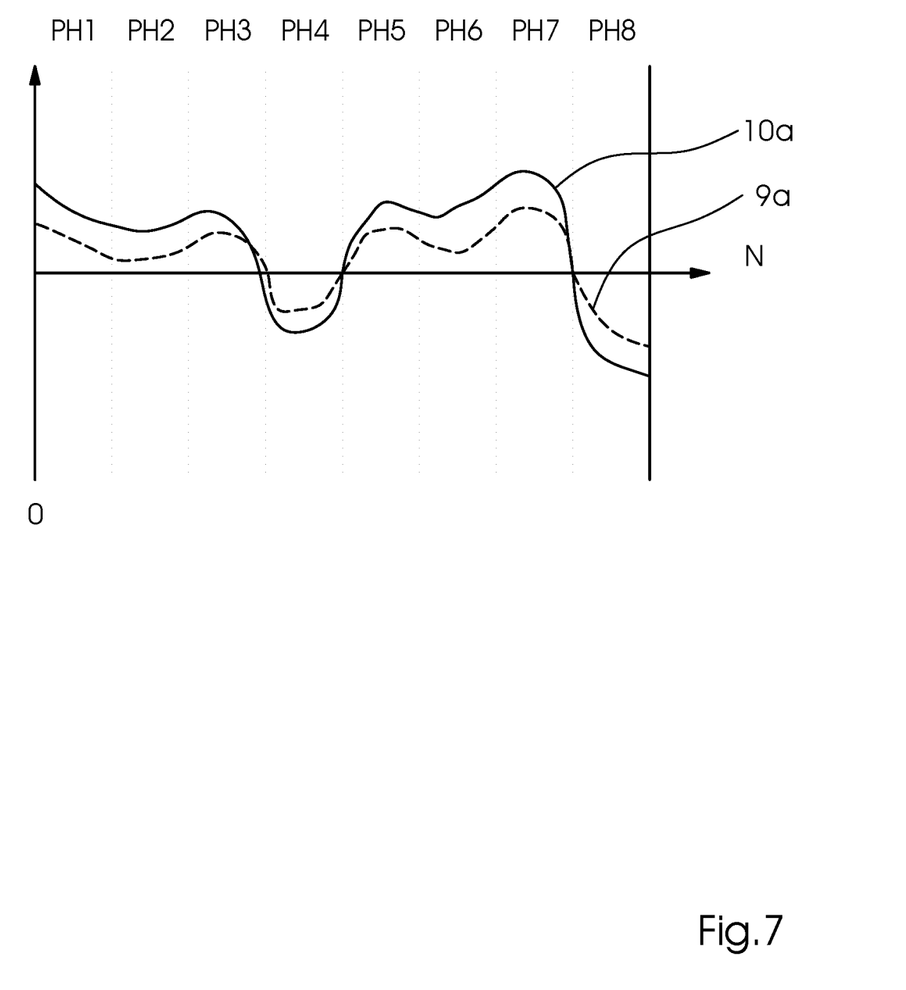
FIG. 7 is a graph showing the result of the adaptation of the average compensation profile.

This allows the mean $DUC_{MPS}$ (n) compensation profile 10a to be adapted to the new MPS-DUCi'(n) compensation profile 9a, which has been adjusted to the new print head by measurement. FIG. 7 shows the result of this adaptation. It is apparent how the mean $DUC_{MPS}$ (n) compensation profile 10a in FIG. 7 for the print head 5 now likewise takes the new print head 5 into account.

Step 7:

The equations Lambda Lj of all other compensation profiles 8, 11 are then used to calculate the invalid ranges of the remaining compensation profiles 8, 11 by their linear relationship to the mean $DUC_{MPS}'(n)$ compensation profiles 10a:

$$Lj \times \text{Mean-}DUC_{MPS}'(n) = MPS\text{-}DUCj'(n).$$

Figure 8:
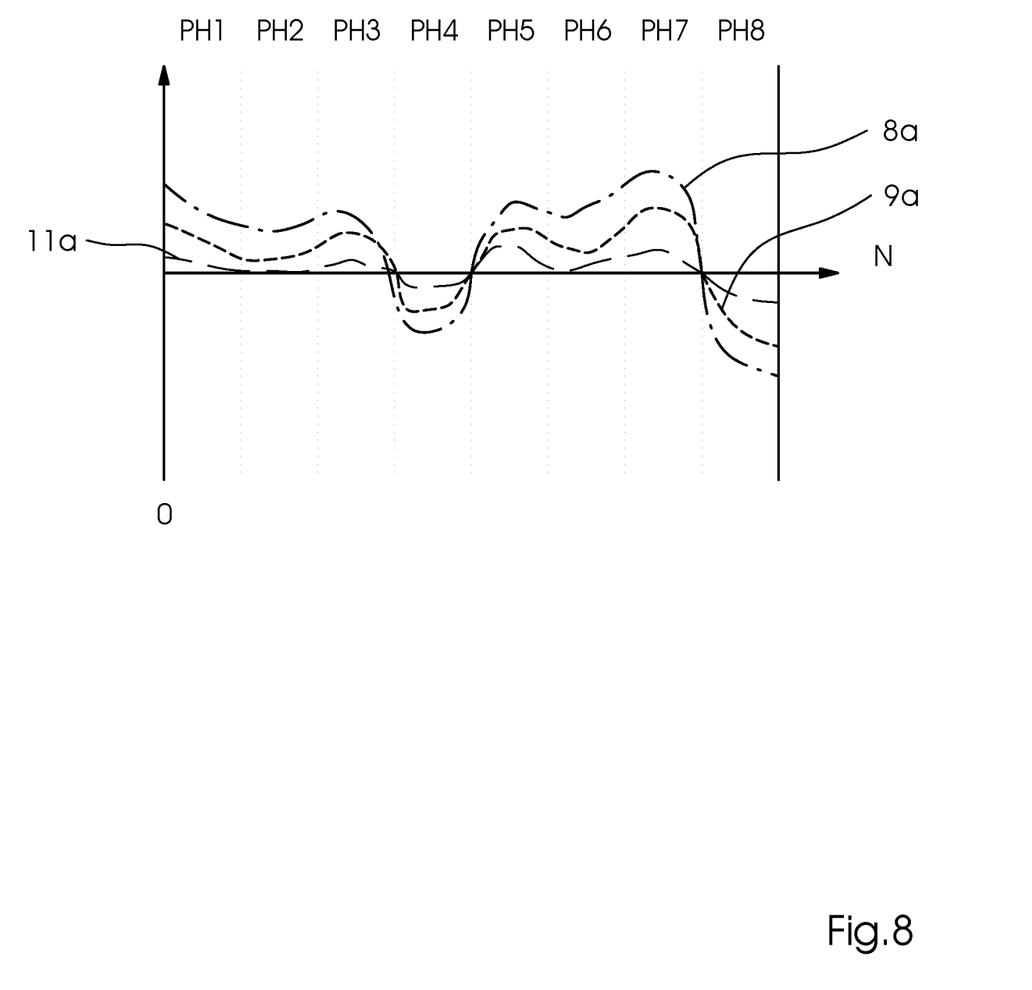
FIG. 8 is a graph showing the result of the adaptation of all compensation profiles.

FIG. 8 shows this for the above-described example. This will not achieve the highest compensation quality, but by simply measuring a single new compensation profile 9a for one print substrate, all other compensation profiles 8a, 11a may likewise be preliminarily adapted to the new print head 5 until at some point the remaining compensation profiles 8a, 11 a may also be adapted to the highest quality by means of new measurements. In an alternative embodiment, there is also the possibility that the compensation profiles 8, 9, 11 of all the print substrates may be adapted to a new print head using a mathematical model. However, this approach is very complex, because the model must consider many parameters and in particular, the specific part caused by the "MPS" environment is influenced in detail by many factors, for example ink distributed on the substrate, coalescence on the substrate, etc.

In contrast, the advantage of the described method according to the invention is that there is no longer any need to use the complex model at all. Only the real measurements performed and the effect of the applied DUC compensation profiles 8, 9, 11 (for density compensation) are used to estimate the effect of a new print head 5 on the density compensation of all print substrates used, without also having to measure all the print substrates.

This approach also takes into account the entire measurement chain (e.g. with regard to camera effects) and all influences and side effects and any errors in the measurements are likewise taken into account. This helps to adapt the compensation profiles 8a, 9a, 11 a to a new print head 5 by means of calculations that take all of these measuring effects into account and at the same time eliminate the source of error in a mathematical model.

The following is a summary list of reference numerals and the corresponding structure used in the above description of the invention:
1 Feeder
2 Print substrate
3 Delivery unit
4 Inkjet printing unit
5 Inkjet print head
6 Computer
7 Inkjet printing machine
8 First compensation profile for print substrate 1/MPS-DUCi'(1)
8a New first compensation profile for print substrate 1/MPS-DUCi'(1)
9 Second compensation profile for print substrate 2/MPS-DUCi'(2)
9a New second compensation profile for print substrate 2/MPS-DUCi'(2)
10 Mean compensation profile/Mean-$DUC_{MPS}(n)$
10a New mean compensation profile/Mean-$DUC_{MPS'(n)}$
11 Third compensation profile for print substrate 3/MPS-DUCi'(3)
11a New third compensation profile for print substrate 3/MPS-DUCi'(3)

The invention claimed is:

1. A method for compensating position-dependent density fluctuations of print nozzles in an inkjet printing machine using a computer, which comprises the steps of:
producing, via the computer, compensation profiles for the position-dependent density fluctuations over all print heads for all print substrates used;
calculating a mean profile from the compensation profiles;
applying the mean profile to compensate for the position-dependent density fluctuations in the inkjet printing machine;
calculating, via the computer, a new compensation profile for only one print substrate if at least one print head of the inkjet printing machine is replaced;
deriving, via the computer, a new mean profile using the new compensation profile; and
calculating and applying, via the computer, the new mean profile using the compensation profiles of remaining ones of the print substrates.

2. The method according to claim 1, wherein in order to prepare the compensation profiles, a respective parameter set is prepared that contains both data about a print substrate and also data about specific parameters of the inkjet printing machine and prepress data.

3. The method according to claim 2, which further comprises carrying out a measurement for each parameter set with an associated print substrate and the specific parameters of the inkjet printing machine and the prepress data, and a respective compensation profile is produced based on the measurement.

4. The method according to claim 1, wherein the computer uses the new mean profile to calculate new compensation profiles for the remaining print substrates.

5. The method according to claim 1, herein the compensation profiles and the mean profile correspond to functions whose function values are compensation values for density fluctuations in the print head, which are dependent on a position of a respective print nozzle in the print head.

6. The method according to claim 1, wherein in order to calculate the mean profile from individual ones of the compensation profiles, the computer determines a similarity of all the compensation profiles generated to the mean profile calculated by means of a mathematical check, and then calculates and applies a new mean profile from a selection of most similar compensation profiles.

7. The method according to claim 1, wherein the method is applied in a sheet-fed or web-fed inkjet printing machine.

* * * * *